June 29, 1965
W. K. KYLE
3,192,463
CONTROL CIRCUITS FOR ELECTRIC MOTORS
Filed March 26, 1962
2 Sheets-Sheet 2
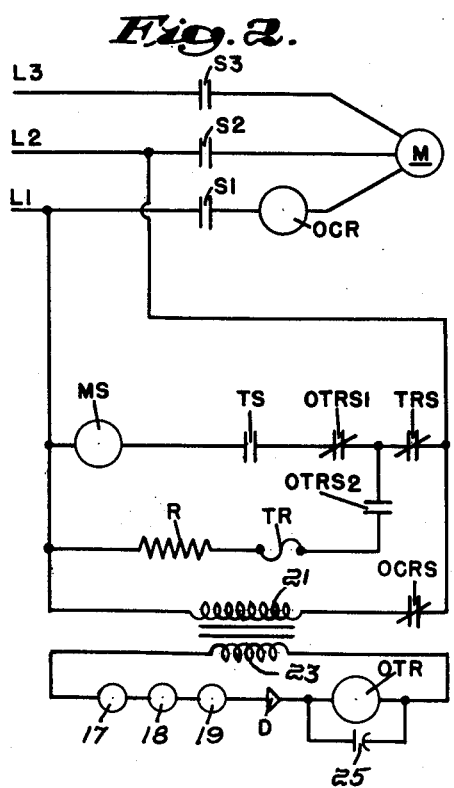
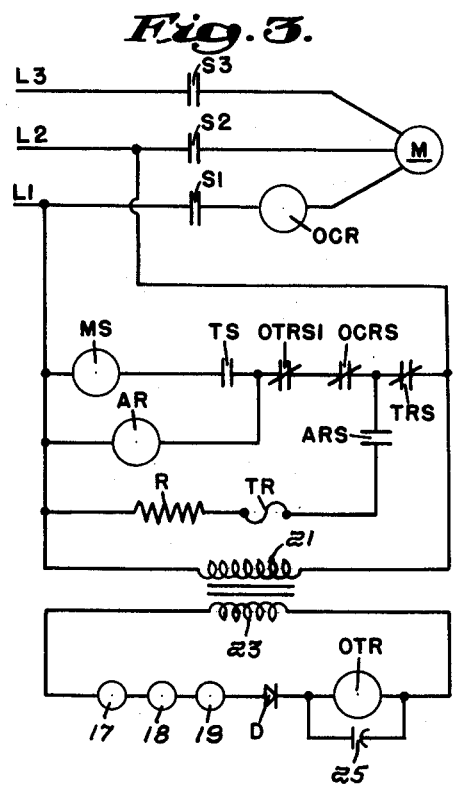
Inventor:
William K. Kyle,
by Robert J. Palmer
Attorney 3,192,463
CONTROL CIRCUITS FOR ELECTRIC MOTORS
William K. Kyle, Staunton, Va., assignor to Westinghouse
Electric Corporation, East Pittsburgh, Pa., a corporation
of Pennsylvania
Filed Mar. 26, 1962, Ser. No. 182,540
12 Claims. (Cl. 318—473)

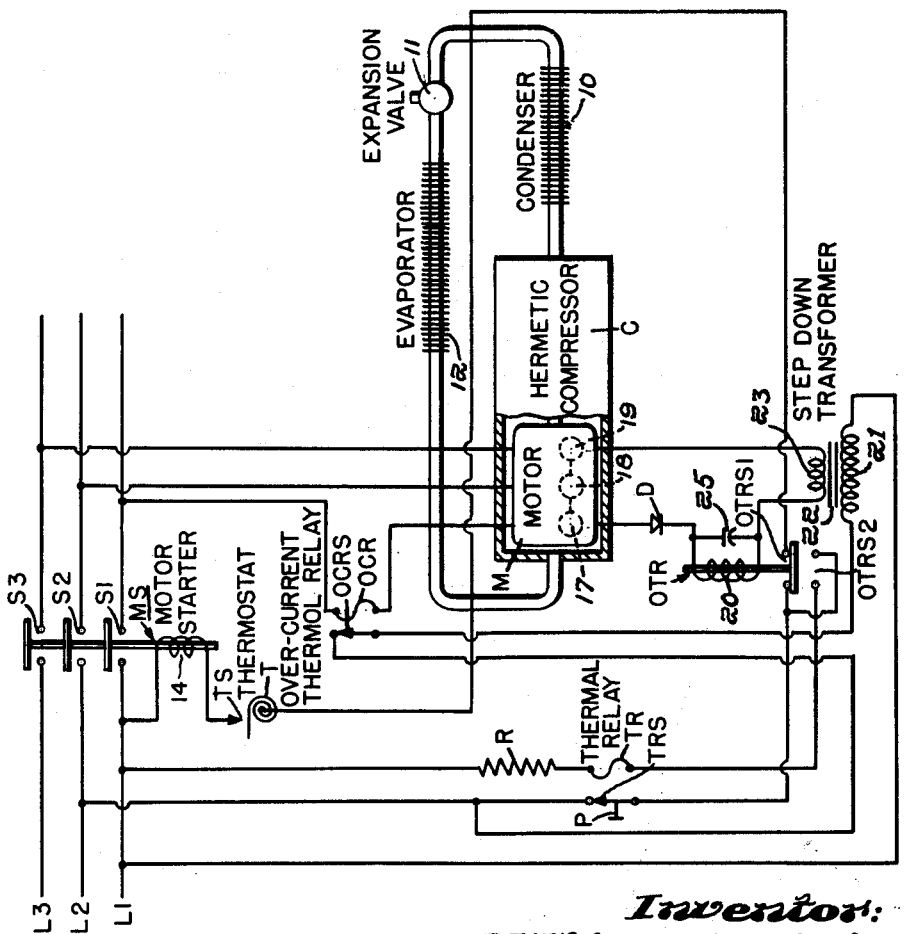

This invention relates to control circuits for electric motors of refrigerant compressors, and relates more particularly to control circuits for electric motors of refrigerant compressors of air cooling units and systems.

The electric motors of refrigerant compressors used in air conditioning units and systems, usually are started and stopped by thermostats exposed to the air being cooled; usually are arranged to be stopped by safety controls which respond to abnormal motor conditions and usually are arranged to be manually restarted by so-called reset switches. It is desirable to have a control system which will electrically lockout under abnormal conditions, which can (1) be remotely reset, (2) does not have to be manually reset after a power failure (assuming no abnormal conditions), and (3) if locked-out due to an abnormal condition, cannot be reset by an interruption of electric power. There are control circuits in use which have some but not all of these desirable characteristics. For example, the control circuits of U.S. Patents Nos. 2,697,195 and Re. 25,049 meet the requirements (1) and (2), but since reset by opening a switch to momentarily interrupt the supply of power, cannot meet requirement (3). The control circuit of U.S. Patent 2,818,535 meets the requirements (1) and (3) but will not meet requirement (2) since it has to be reset after a power failure.

This invention is a control circuit which meets all three requirements.

An object of this invention is to improve control circuits for the motors of refrigerant compressors.

This invention will now be described with reference to the annexed drawings, of which:

FIG. 1 is a diagrammatic view of one embodiment of this invention;

FIG. 2 is a simplified circuit schematic of FIG. 1, and

FIG. 3 is a modification of FIG. 2.

Referring now to the drawings, a hermetically-sealed refrigerant compressor C, driven by an electric motor M which is cooled by suction gas, is connected in a refrigerant circuit including a condenser 10, an expansion valve 11, and an evaporator 12. The motor M is connected to three-phase supply lines L1, L2 and L3 through switches S1, S2 and S3 respectively, of motor starter MS which has an energizing coil 14. Connected between the motor M and the switch S1 is thermal over-current relay OCR which has a normally closed switch OCRS.

Embedded in the stator winding of the motor M are thermistors 17, 18 and 19 which are connected in series with diode D, coil 20 of over-temperature relay OTR and secondary winding 23 of step-down transformer 22. Primary winding 21 of the transformer is connected to the supply lines L1 and L2 through the switch OCRS. The coil 20 of the relay OTR is shunted by by-pass capacitor 25.

The thermistors 17, 18 and 19 are of the positive temperature coefficient of resistance type, the electrical resistances of which increase rapidly at critical temperatures.

The relay OTR has a normally closed switch OTRS1, and a normally open switch OTSR2 (assuming power is applied to the circuit).

The coil 14 of the motor starter MS is connected in series with the supply line L1, switch TS of room thermostat T, the switch OTRS1, switch TRS of thermal relay TR and the supply line L2. The relay TR is connected in series with the supply line L1, resistor R and the switch OTRS2 to the junction of the switches OTRS1 and TRS, and so in connection in series with the switch TRS to the supply line L2.

When the thermostat T calls for cooling, its switch TS closes and energizes the motor starter MS through the series connection of its coil 14, the now closed switch TS, and the closed switches OTRS1 and TRS, to the supply lines L1 and L2. The motor starter closes its switches S1, S2 and S3, connecting the compressor motor M to the supply lines L1, L2 and L3. The system is now in normal operation.

If there is an abnormal increase in the temperature of the motor M, the resistances of the thermistors 17, 18 and 19 will increase and deenergize the over-temperature relay OTR which will open its switch OTRS1 and close its switch OTRS2. Opening the switch OTRS1 will deenergize the compressor motor M. Closing the switch OTRS2 energizes the thermal relay TR which opens its switch TRS which deenergizes the relay TR.

If there is an abnormal increase in motor current, without an abnormal increase in motor temperature, the overcurrent relay OCR will open its switch OCRS, disconnecting the transformer 22 from the electric supply lines. The over-temperature relay OTR will be deenergized and will open its switch OTRS1 and close its switch OTRS2. Opening the switch OTRS1 deenergizes the compressor motor M, and closing the switch OTRS2 energizes the thermal relay TR which opens its switch TRS which deenergizes the relay TR.

The resistor R limits the current flowing through the thermal relay TR, and its resistance and the characteristics of the relay TR are so chosen as to provide a slight delay in the opening of the switch TRS long enough for the relay OTR to operate whenever power is connected, or is restored after an interruption.

Thus, either an abnormal increase in motor temperature or an abnormal increase in motor current, causes the thermal relay to be energized and to open its switch TRS. Since the compressor C is a hermetically sealed one with its motor cooled by suction gas, large motor currents do not necessarily cause high motor temperatures since under heavy motor loading there is a large motor cooling. Ordinarily in a hermetic compressor, the motor is heated more at light loads (small currents) than at heavy loads (large currents) due to higher suction gas temperatures.

The thermal relay TR is of the circuit-breaker type having a manually reset plunger P which has to be used to close the switch TS and restart the compressor after the relay OCR or OTR has acted to stop it. Experience has shown that in most cases the abnormal condition that has stopped the compressor motor is a temporary one so that operation can be restored by closing the switch TRS. If one of the safety controls continues to stop the compressor, the operator will know that there is trouble requiring a serviceman to be called.

Going back to the desired characteristics, it will be noter that requirement (1) is met since the thermal relay can be located at a distance from the compressor. It will be noted that requirement (2) is met since upon a restoration of power after a power failure (assuming no abnormal motor condition), the switch OTRS1 will close, and it will be noted that requirement (3) is met since, if an abnormal motor condition persists after restoration of power after a power failure, the switch TRS will have to be reclosed before the compressor motor can be restarted.

The circuit of FIG. 3 performs the same function as that of FIGS. 1 and 2, but differs therefrom in that the switch OTRS2 is not connected in series with the thermal relay TR and is not otherwise used, an auxiliary relay AR is connected between the line L1 and the junction of the switches TS and OTRS1; switch ARS of the relay is connected where OTRS2 connected in FIG. 2 (in series with the relay TR), and the switch OCRS is connected in series with the starter MS instead of in series with the primary winding of the transformer 22, between the switches OTRS1 and TRS, with the relay TR connected to the junction of switches OCRS and TRS instead of to the junction of the switches OTRS1 and TRS.

The relay AR, when the thermostat switch TS is open, is energized by its connection to the supply line L1, and by its connection through the closed switches OTRS1, OCRS and TRS to the supply line S2, and holds open its switch ARS, preventing the thermal relay TR from being energized. When the thermostat T calls for cooling and closes its switch TS, it connects the compressor starter MS through the closed switches TS, OTRS1, OCRS and TRS across the lines L1 and L2, energizing the starter MS, and starting the motor M.

If an abnormal increase in motor temperature occurs, the resistance of the thermistors 17, 18 and 19 will increase sufficiently to deenergize the relay OTR, causing its switch OTRS1 to open and to disconnect the starter MS and the relay AR from the supply line L2, stopping the motor M, and deenergizing the relay AR. The switch ARS of the relay AR closes and connects the relay TR to the supply line L1, energizing the relay TR and causing its switch TRS to open, and to disconnect all components from the supply line L2. As in the case of FIGS. 1 and 2, the motor M can be restarted (assuming that the overheat condition was temporary) only by manually reclosing the switch TRS. The switch OTRS1 will have reclosed and power will be restored to the starter MS and the relay AR. The relay AR will open its switch ARS deenergizing the relay TR so that it cannot reopen its switch TRS.

If an abnormal increase in motor current occurs, the relay OCR will be energized sufficiently for its switch OCRS to open and to disconnect the starter MS and the relay AR from the line L2, stopping the motor M, and deenergizing the relay AR so that its switch ARS closes and energizes the relay TR which opens its switch TRS and disconnects all components from the supply line L2. Assuming the over current condition was temporary, the motor can be restarted and the relay AR can again be energized only by manually reclosing the switch TRS. When power is restored after a power failure, the relay AR will be energized to open its switch ARS before the latter can have energized the relay TR.

As in the circuit of FIG. 2, the relay TR can be located at a distance from the motor; the switch TRS cannot be automatically reclosed by restoration of power after a power failure, and operation can be restored, assuming that the abnormal condition that operated the safety control was temporary, by manually reclosing the switch TRS.

The control circuit could include other safety controls such as conventional high and low pressure, refrigerant cut-outs, but since such can be manually reset, they are not involved in this invention.

What is claimed is:

1. A control circuit for an electric motor comprising electric supply connections, a starter for said motor having switching means for connecting said motor to said connections, a thermostat having a switch, a circuit breaker having a normally closed switch which opens when said breaker is connected to said connections and which has to be reclosed manually after it opens, a second normally closed switch, a normally open switch, means including said thermostat switch, when closed, and said closed switches for connecting said starter to said connections, means including said open switch, when closed, and said breaker switch for connecting said breaker to said connections, and means including means responsive to an abnormal condition of said motor for opening said second switch and for closing said open switch when said abnormal condition occurs.

2. A control circuit as claimed in claim 1 in which said breaker is a time delay breaker.

3. A control circuit as claimed in claim 2 in which said means responsive to an abnormal condition comprises thermistor means in heat exchange contact with said motor, said thermistor means having a positive temperature coefficient of resistance.

4. A control circuit as claimed in claim 1 in which said means responsive to an abnormal condition comprises thermistor means in heat exchange contact with said motor, said thermistor means having a positive temperature coefficient of resistance.

5. A control circuit as claimed in claim 4 in which an overload relay is connected in series with said motor and said switching means, in which said overload relay has a normally closed switch, and in which means including said last mentioned switch is provided for connecting said thermistor means to said connections.

6. A control circuit as claimed in claim 5 in which said breaker is a time delay breaker.

7. A control circuit as claimed in claim 1 in which said means responsive to an abnormal condition comprises positive temperature of coefficient resistance thermistor means in heat exchange contact with said motor, in which an overload relay is connected between said motor and said switching means, in which said overload relay has a normally closed switch, and in which said last mentioned switch is connected in said means connecting said starter to said connections.

8. A control circuit as claimed in claim 7 in which said breaker is a time delay breaker.

9. A control circuit for an electric motor comprising electric supply connections, a starter having switching means for connecting said motor to said connections, an overload relay connected between said motor and said switching means, a thermostat having a switch a circuit breaker having a normally closed switch which opens when said breaker is connected to said connections and which has to be reclosed manually after it opens, a second relay having a normally closed switch and a normally open switch, means including said thermostat switch, said breaker switch and said closed switch of said second relay for connecting said starter to said connections, means including said open switch, when closed, and said breaker switch for connecting said breaker to said connections, said overload relay having a normally closed switch, a transformer having primary and secondary windings, means including said last mentioned switch for connecting said primary winding to said connections, positive temperature coefficient of resistance means in heat exchange contact with said motor, and means connecting said thermistor means and said second relay in series with said secondary winding.

10. A control circuit as claimed in claim 9 in which said breaker is a time delay breaker.

11. A control circuit for an electric motor comprising electric supply connections, a starter having switching means for connecting said motor to said connections, an overload relay connected between said motor and said switching means, said overload relay having a normally closed switch, a thermostat having a switch, a circuit breaker having a normally closed switch which has to be reclosed manually after it opens, a second relay having a normally closed switch, a third relay having a normally open switch, means including said thermostat, said breaker, said second relay and said overload relay switches for connecting said starter to said connections, means including said open switch of said third relay, when closed, and said breaker switch for connecting said breaker to said connections, means including said breaker switch, said switch of said overload relay, and said switch of said second relay for connecting said third relay to said connections, a transformer having a primary winding and a secondary winding, means connecting said primary winding to said connections, positive temperature coefficient of resistance thermistor means in heat exchange contact with said motor, and means connecting said thermistor means and said second relay to said secondary winding.

12. A control circuit as claimed in claim 11 in which said breaker is of the time delay type.

References Cited by the Examiner

UNITED STATES PATENTS

| | | | |
|---|---|---|---|
| Re. 25,049 | 10/61 | Winter | 318—452 |
| 2,818,535 | 12/57 | Skeut et al. | 318—452 |
| 2,898,746 | 8/59 | Moberry | 317—157 |
| 2,976,463 | 3/61 | Adams | 318—473 |
| 3,064,444 | 11/62 | Kyle | 318—471 X |
| 3,065,381 | 11/62 | Kyle | 318—473 X |
| 3,079,524 | 2/63 | Gibson | 318—473 |

ORIS L. RADER, *Primary Examiner.*